US005760808A

United States Patent [19]

Wiedemer

[11] Patent Number: 5,760,808

[45] Date of Patent: Jun. 2, 1998

[54] THERMOELECTRIC PRINTING UNIT FOR TRANSFERRING AN INK ONTO A RECORDING MEDIUM

[75] Inventor: Manfred Wiedemer, Ismaning, Germany

[73] Assignee: Océ Printing Systems GmbH, Poing, Germany

[21] Appl. No.: 727,412

[22] PCT Filed: Nov. 29, 1994

[86] PCT No.: PCT/DE94/01417

§ 371 Date: Oct. 17, 1996

§ 102(e) Date: Oct. 17, 1996

[87] PCT Pub. No.: WO95/29063

PCT Pub. Date: Nov. 2, 1995

[30] Foreign Application Priority Data

Apr. 20, 1994 [DE] Germany .......................... 44 13 680.3

[51] Int. Cl.$^6$ .............................. B41J 2/01; G01D 15/16

[52] U.S. Cl. .......................................... 347/103; 346/140.1

[58] Field of Search ................................ 347/103, 91, 66, 347/33, 22; 346/140.1

[56] References Cited

U.S. PATENT DOCUMENTS

| | | | |
|---|---|---|---|
| 3,655,379 | 4/1972 | Gundlach . | |
| 4,608,577 | 8/1986 | Hori | 347/91 |
| 4,627,346 | 12/1986 | Dietzell et al. . | |
| 4,630,075 | 12/1986 | Hori . | |
| 4,785,311 | 11/1988 | Kaneko et al. . | |
| 4,855,768 | 8/1989 | Lino | 347/91 |
| 5,081,472 | 1/1992 | Fisher | 347/33 |
| 5,481,280 | 1/1996 | Lam et al. | 346/140.1 |

FOREIGN PATENT DOCUMENTS

| | | |
|---|---|---|
| 0600712 | 6/1994 | European Pat. Off. . |
| 2699452 | 6/1994 | France . |
| 280 933 A1 | 7/1990 | Germany . |
| 2134041 | 8/1984 | United Kingdom . |

OTHER PUBLICATIONS

Patent Abstracts of Japan, M-787, vol. 13, No. 25, Jan. 20, 1989, JP-A-63-236-656.

*Primary Examiner*—Benjamin R. Fuller
*Assistant Examiner*—Thinh Nguyen
*Attorney, Agent, or Firm*—Hill & Simpson

[57] ABSTRACT

A printing drum (10) contains printing elements (30). These printing elements (30) are each designed as a depression in the surface of the printing drum (10). The printing elements (30) are arranged in the manner of matrix rows. A printing drum (10) has more than one matrix row (33) of printing elements (30). Each printing element (30) contains a selectively activatable heating device (31) which is capable of heating ink (13) contained in the printing element (30), in such a way that, utilizing a gas bubble formed at the same time, the ink is ejected out of the printing element (30) in the direction of a recording medium (14). The printing elements (30) are filled with ink (13) in an inking station (11).

12 Claims, 4 Drawing Sheets

THERMOELECTRIC PRINTING UNIT FOR TRANSFERRING AN INK ONTO A RECORDING MEDIUM

BACKGROUND OF THE INVENTION

The invention relates to a thermoelectric printing unit for transferring an ink onto a recording medium. Various thermoelectric printing units are known:

In thermal printing, heat-sensitive paper is printed by a heatable printing head as a result of the heating of selected points on the paper, the heated points changing color.

In the thermal transfer printing method, a color-containing wax layer located on a carrier foil is partially melted by means of heatable printing elements and is transferred onto paper.

In a thermal ink printing unit, ink is sprayed out of a nozzle onto a recording medium. The nozzles have a heating device which can be activated individually for each nozzle. The ink contained in the nozzle is heated by the heating device, thereby producing a gas bubble which expels the ink from the nozzle.

In this case, a liquid which contains color pigments serves as ink. Furthermore, it is heat-resistant to approximately 350° C., is nontoxic, being made, for example, on a water base, and causes no deposit in the nozzles.

Conventionally, the nozzles are located in a printing head. The printing head has an ink supply, from which the nozzles are supplied with ink by means of capillary forces. The maximum spray frequency of such ink-jet printing units having a thermoelectric converter (bubble jet) is limited to approximately 4 kHz. Depending on the drop size, the ink needs 250 μs and above before the ink sucked up as a result of the capillary forces is available for the next spray operation. In contrast, the activation time for the heating element in the nozzle of approximately 5 to 10 μs and the time to drop formation of approximately 50 μs are relatively short. As a consequence of the principle used, the spray frequency cannot be appreciably increased.

U.S. Pat. No. 4,785,311 discloses a cylindrical printing roller, the casing of which has a plurality of passage orifices for a high-viscosity ink which are arranged in a matrix-like manner. The ink is stored inside the printing roller. Each passage orifice is assigned a selectively activatable heating element, by means of which a throughflow of the ink through the passage orifice can be released. Due to gravity, the released ink flows directly onto a recording medium which is in touch contact with the corresponding surface of the printing roller, said surface being located in the region of the released passage orifice.

The printing speed can be increased by means of the known printing roller. Since the printing roller is in direct contact with the recording medium as a consequence of the principle used, there is the risk that the passage orifices will become soiled and consequently the quality of the printing image reduced. Furthermore, on account of the direct contact between the printing roller and recording medium, it is absolutely necessary to arrange the passage orifices on the printing roller as an endless matrix according to the resolution of the printing image. The fineness of the resolution of the printing image is thereby limited, since a large number of passage orifices have to be coupled electrically to an activation unit and the coupling paths cannot be reduced as desired. On account of the storage of the ink in the printing roller, it is extremely difficult to carry out a change of the printing ink when the same printing roller is used.

SUMMARY OF THE INVENTION

The object on which the present invention is based is to provide a thermoelectric printing unit for transferring an ink onto a recording medium, said printing unit making it possible to control the printing speed without losses in the resolution of the printing image, in the quality of the printing image and in the serviceability of the thermoelectric printing unit.

In general terms the present invention is a thermoelectric printing unit for transferring an ink onto a recording medium. The printing unit has a printing drum. More than one matrix row of printing elements which are arranged on the printing drum and which are each designed as a depression in the surface of the printing drum are provided. A selectively activatable heating device is provided in the depression. An inking station is arranged on the circumference of the printing drum and allows ink to be introduced from the surface of the printing drum into the printing elements. A transfer printing point, at which the heating elements can be activated according to printing information, causes ink to be expelled out of the corresponding printing elements towards the recording medium.

Advantageous developments of the present invention are as follows.

The inking station contains a distributor roller, the surface of which rolls tangentially on the surface of the printing drum. The inking station also has a trough which extends along the distributor roller, which is filled with ink and into which the distributor roller partially dips.

A stripping batten follows the rolling region in the direction of movement of the printing drum and extends along the surface of the printing drum and strips excess ink from the surface.

A cleaning station is arranged on the circumference of the printing drum and if required, can be brought into contact with the surface of the printing drum.

A hydrophobic and/or oliophobic protective layer forms the outer surface of the printing drum.

An arrangement of the printing elements is an endless matrix, the arrangement corresponding to the resolution of the printing image.

An arrangement of at least two matrix rows extends axially on the printing drum, heating elements of which can be activated alternately. The directly adjacent printing elements are arranged offset along the matrix row on both sides of a bisecting line.

Matrix rows extend diagonally between the end faces of the printing drum.

A recording medium is designed as an intermediate carrier and rolls on a printing material in the region of a backing device, as a result of which the printing image can be transferred onto the printing material. A plurality of printing drums is assigned to the intermediate carrier.

An activation unit is provided for the selectively activatable heating devices, which activation unit can be coupled to the printing drum.

By virtue of the arrangement of more than one matrix row of printing elements on a printing drum and the filling of these with ink from the surface of the printing drum, a high quality of the printing image can be achieved, along with essentially any resolution of the printing image, whilst at the same time the printing speed is increased. The color of the printing image can be changed in a simple way by exchanging the inking station arranged on the circumference of the printing drum. The increased printing speed can be achieved by virtue of the multiple arrangement of the printing elements. As a result, the time for refilling the printing elements with ink and thermal stabilization can take a relatively long time. Spray frequencies of 20 kHz can be achieved. The spray frequency can be increased to more than 40 kHz by a so-called overlapping activation of two matrix rows. In overlapping activation, a subsequent spray operation is initiated while the current spray operation is still taking place. The matrix rows of printing elements arranged on the printing drum and having the heating elements located in them and the conduction paths necessary for the supply of energy can be produced by means of manufacturing techniques which are known from semiconductor technology.

According to one design and embodiment of the invention, the inking station has a distributor roller, the surface of which rolls tangentially on the surface of the printing drum. The distributor roller partially dips into a trough which extends along the distributor roller and is filled with ink. The ink can thereby be guided onto the printing drum in a uniformly metered manner over the entire longitudinal extension of the printing drum and can be introduced into the printing elements.

According to one development and embodiment of the invention, the rolling region of the distributor roller on the printing drum is followed in the direction of movement of the printing drum by a stripping batten which extends along the surface of the printing drum and strips excess ink from the surface. Excess ink is thereby returned into the inking station. The surface of the printing drum is cleaned of any ink residues. The cleaning effect is assisted by the design of the invention, according to which the outer surface of the printing drum is formed by a hydrophobic and/or oliophobic protective layer. Whether the hydrophobic and/or the oliophobic protective layer is selected depends on the ink used.

As a result of that development of the invention according to which there is arranged on the circumference of the printing drum a cleaning station which can, if required, be brought into contact with the surface of the printing drum, the printing drum can be freed of adhering ink or of soiling in lengthy printing intermissions or in cleaning intervals which may be necessary.

According to a further development and embodiment of the invention, the recording medium is designed as an intermediate carrier which rolls on a printing material in the region of a backing device, as a result of which the printing image can be transferred onto the printing material. Direct influence on the printing drum by the printing material, for example paper, can be prevented by the intermediate carrier. The reliability of the printing unit and the quality of the printing image can be further increased thereby. The lifetime of the printing drum can also be increased. The intermediate carrier is preferably made from an elastic material, for example rubber or silicone. It can consequently adapt itself to a rough surface or to irregular shapes, for example in label printing, of a printing material. Nevertheless, in the transfer printing operation from the printing drum to the intermediate carrier, a uniform distance between their surfaces is ensured, with the result that lack of definition of the printing image is avoided.

According to a further development and embodiment of the invention, the intermediate carrier is assigned a plurality of printing drums. The printing elements of the various printing drums can be filled with differently colored inks. Multicolor printing can thereby be carried out. Since transfer printing on the individual printing drums takes place contactlessly relative to the intermediate carrier, color entrainment is ruled out.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
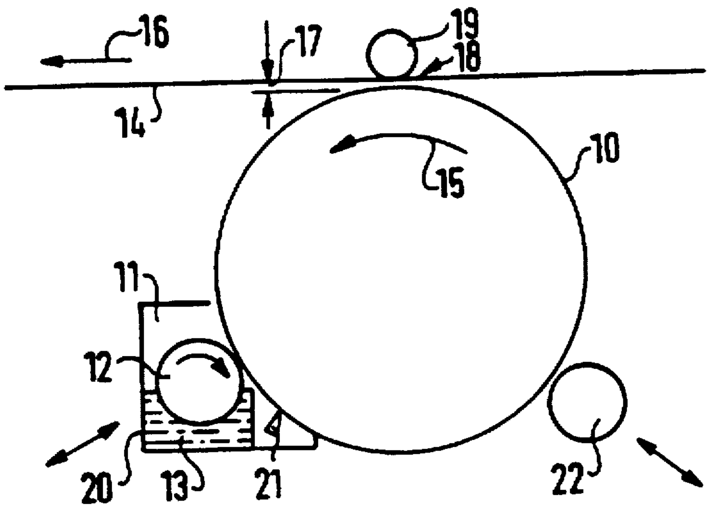
FIG. 1 shows a thermoelectric printing unit for transferring an ink onto a recording medium, with a printing drum and with an inking station for the printing drum.

A thermoelectric printing unit for transferring an ink 13 onto a recording medium 14 contains a circular-cylindrical printing drum 10 which rotates in the direction of rotation 15. The recording medium 14 is guided past the printing drum at the distance 17 in the direction of transport 16 of the recording medium at a transfer printing point 18. At the transfer printing point 18, the direction of transport 16 of the recording medium and the direction of rotation 15 of the printing drum 10 are the same. A transfer printing roller 19 is arranged at the transfer printing point 18. The axis of symmetry of the transfer printing roller 19 is parallel to the axis of rotation of the printing drum 10 and perpendicular to the direction of transport 16 of the recording medium. The recording medium 14 is transported through between the transfer printing roller 19 and the printing drum 10. The recording medium 14, at the same time, rolls tangentially over its entire width on the transfer printing roller 19. The uniform distance 17 between the recording medium and the printing drum 10 is consequently guaranteed by the transfer printing roller 19.

Furthermore, the thermoelectric printing unit contains an inking station 11 which is arranged on the circumference of the printing drum 10. The inking station 11 contains a circular-cylindrical distributor roller 12, the surface of which rolls tangentially on the surface of the printing drum 10. The distributor roller 12 is mounted in a trough 20 which extends along the distributor roller 12. The trough 20 is filled with ink 13, so that the distributor roller 12 partially dips, for example with half its circumference, into the ink 13. When it dips in, the distributor roller 12 takes up the ink 13 and transfers the ink 13 adhering to it to the printing drum 10. So that sufficient quantities of ink 13 can be transported, the distributor roller 12 contains porous material.

The rolling region between the printing drum 10 and distributor roller 12 is followed in the direction of rotation 15 by a stripping batten 21 which extends along the surface of the printing drum 10 and strips excess ink 13 from the surface of the latter. The excess ink 13 is intercepted by the trough 20 and is supplied again, by means not shown, to the ink supply 13 located in the trough 20.

Furthermore, the thermoelectric printing unit contains a cleaning station designed as a cleaning roller 22. The cleaning roller 22 can be pivoted onto the printing drum 10 in such a way that said cleaning roller rolls tangentially on the printing drum 10 over the entire width of the latter. The surface of the cleaning roller 22 is formed by absorbent material, for example a fleece. In the event that the cleaning roller 22 is pivoted onto the printing drum 10, the inking station 11 or its distributor roller 12 is pivoted away from the printing drum 10.

On the printing drum 10 are arranged matrix rows 33 which extend from one end face of the printing drum 10 to the other end face. A matrix row 33 is composed of a plurality of individual printing elements 30. The printing elements 30 are designed as depressions in the surface of the printing drum 10, a selectively activatable heating device 31 being located in the depression.

Figure 2:
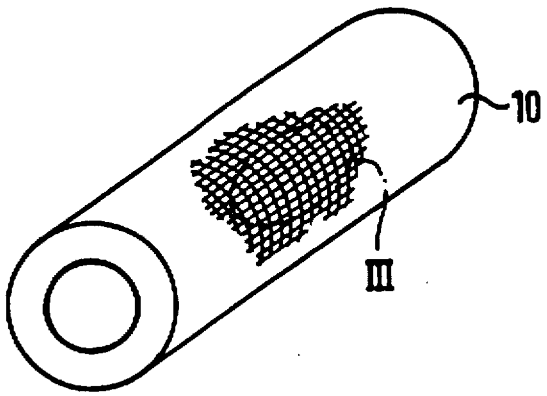
FIG. 2 shows a printing drum with an arrangement of printing elements as an endless matrix.
Figure 3:
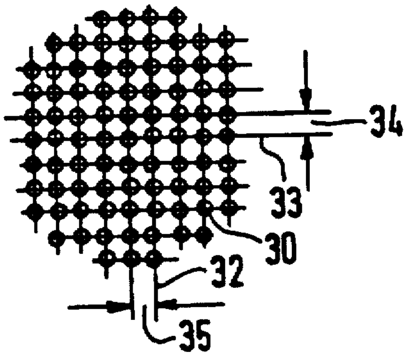
FIG. 3 shows a detail of the surface of the printing drum according to FIG. 2.

According to FIGS. 2 and 3, a plurality of matrix rows 33 extends axially on the printing drum 10 at a uniform spacing. The row spacings 34 as well as the column spacings 35 correspond to the resolution of the printing image. The arrangement of the printing elements 30 thus corresponds to an endless matrix. At a resolution of 240 dpi (dots per inch), the row spacing 34 and the column spacing 35 correspond to 1/240inch. The diameter of the depression of a printing element 30 is about 50 μm. The heating elements 31 contained in the depressions of the printing elements 30 can be activated selectively by means of a network of column and row lines 42, 43. For this purpose, the column and row lines 42, 43 are coupled to an activation unit 40.

Figure 4:
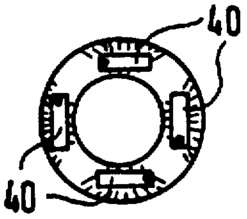
FIG. 4 shows an end view of the printing drum according to FIG. 2, with an activation unit for the printing elements.

According to FIG. 4, the activation unit 40 is arranged on the end face of the printing drum 10. The activation unit 40 is formed by a module having a plurality of integrated circuits and is mounted on the end face of the printing drum 10. The connections to the column and row lines 42, 43 are made by bonding or laser beam welding. The arrangement of the activation unit 40 on the printing drum 10 ensures that it is always the matrix row 33 located at the transfer printing point 18 which is loaded with printing information supplied by the printer or copier.

Figure 5:
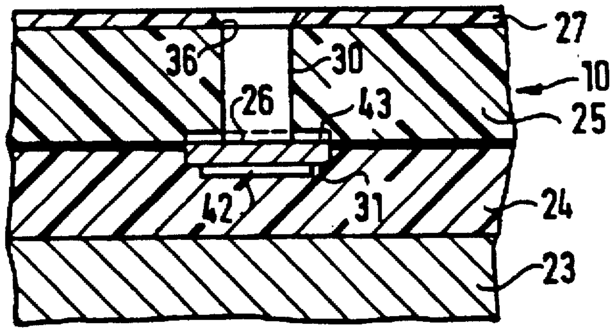
FIG. 5 shows a sectional representation of a printing element.
Figure 6:
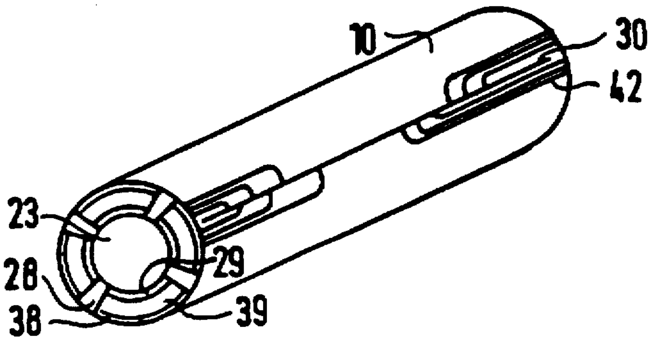
FIG. 6 shows a printing drum with an arrangement of four matrix rows extending axially on the printing drum.

The printing element 30 is constructed according to FIG. 5. A first layer 24 is applied on a carrier 23 which forms the core of the printing drum 10. Column lines 42 are embedded in this first layer 24. Row lines 43 are embedded in a second layer 25 located above the first layer 24. At their intersection points, heating elements 31 are introduced between the column lines 42 and the row lines 43. The second layer 25 has, at intersection points, circular-cylindrical perforations which form the depressions reaching as far as the heating elements 31. Provided on the heating element 31, in the region of the depression, is a protective layer 26 which prevents direct contact between the heating element 31 and ink 13. A third layer 27, which surrounds the second layer 25, forms the outer surface of the printing drum 10. The third layer 27 has funnel-shaped perforations 36 aligned with the depressions of the printing elements 30. The third layer consists of hydrophobic material. An accumulation of ink 13 on the drum surface is thereby avoided. The funnel-like perforation 36 assists the filling of the printing element 30 by preventing inclusions of air caused by the distributor roller 12.

During printing operation, the distributor roller 12 is always in contact with the printing drum 10. The distributor roller 12 conveys ink 13 into the printing elements 30. The ink 13 remains in the printing element 30 as far as the transfer printing point 18 and is expelled there out of the printing element 30, depending on the particular printing information. For this purpose, the heating resistors 31 arranged at the intersection point of the row and column lines 43, 42 are supplied with current and thus heated. This heat is transmitted to the ink 13, as a result of which a vapor bubble forms. The vapor bubble expels the ink 13 out of the printing element 30. The drop-like ink 13 strikes the recording medium 14. The ink drops deliquesce there, with the result that a closed strip is obtained in spite of the non-overlapping geometrical arrangement of the printing elements 30. The printing elements 30 from which the ink 13 has been removed in this way are subsequently filled with ink 13 again at the inking station 11.

According to FIGS. 6 to 9, four matrix rows 33, which extend axially on the printing drum 10 between its end faces, are arranged on the printing drum 10. In this exemplary embodiment of the printing drum 10, the circumference of the printing drum 10 is divided into four sectors insulated from one another. Each sector, starting from the carrier 23 forming the core of the printing drum 10, is constructed in the following way: an electrically conductive layer 39 is applied on the carrier 23 above insulation 29. The layer 39 serves as a row line 43. Arranged on the layer 39 is a foil 38 which contains a matrix row, with printing elements 30, and the associated column lines 42. The individual sectors are electrically insulated from one another by means of insulation 28 which is introduced between the sectors. Arranged on one end face of the printing drum 10 is an activation unit 40 according to FIG. 4, which is coupled to the column lines 42 designed as foil conductor tracks and to the row line 43.

Figure 7:
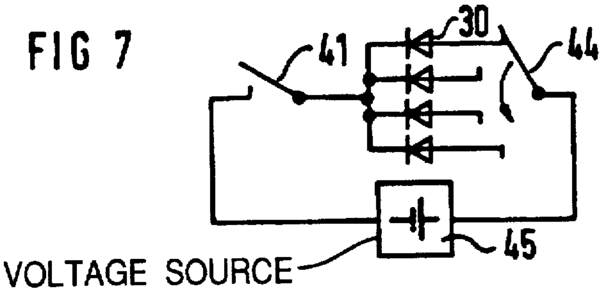
FIG. 7 shows a basic circuit diagram for the activation of the heating devices of a column in the various matrix rows according to FIG. 6.
Figure 8:
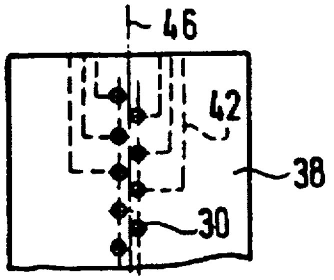
FIG. 8 shows an arrangement of individual printing elements of a matrix row according to FIG. 6.
Figure 9:
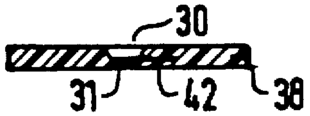
FIG. 9 shows a sectional representation of a printing element according to FIG. 6.

According to FIG. 7, the activation unit 40 has column switches 41 and a row switch 44. The row switch 44 connects in each case that matrix row 33 located in the region of the transfer printing point 18 to a voltage source 45. By means of the column switches 41, the heating element 31 of a printing element 30 is connected to the voltage source 45 according to the existing printing information. The heating element 31 has an electrical resistance of 30 to 100 ohm and is loaded with a voltage of between 5 and 40 volt from the voltage source 45.

The foil 38 is constructed by means of methods known from printed circuit board technology. The printing elements 30 are formed by perforations having funnel-shaped orifices, the perforations being closed by the heating elements 31. The heating element 31 reaches as far as the underside of the foil 38 and can thereby be brought into direct contact with the layer 39. The conductor tracks 42 are embedded in the foil 38.

In view of the expected thermal load on the foil 38 and the current load of the voltage source 45, the directly adjacent printing elements 30 are arranged to be offset along the matrix row and on both sides of a bisecting line. Nevertheless, since the rotational speed of the printing drum 10 is higher than the transport speed of the recording medium 14, a positionally exact transfer of the ink 13 onto the recording medium 14 can be guaranteed by an appropriate activation of the printing elements 30 which are located either on one side of the bisecting line 46 or on the other. Time-offset activation leads to a uniform current load of the voltage source 45.

Figure 10:
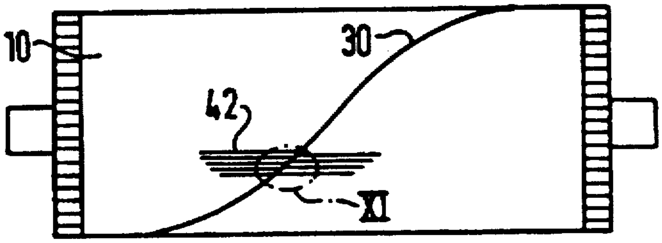
FIG. 10 shows a printing drum having a matrix row extending diagonally between the end faces.
Figure 11:
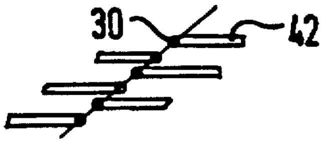
FIG. 11 shows a detail of the surface of the printing drum according to FIG. 10 with individual printing elements.
Figure 12:
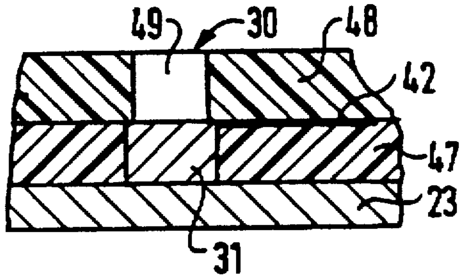
FIG. 12 shows a sectional representation of a printing element according to FIG. 10.

A further version of the arrangement of a matrix row 33 on the printing drum 10 is illustrated in FIGS. 10 and 11. On the printing drum 10, two matrix rows 33 extend diagonally between the end faces of the printing drum 10. The rotational speed of the printing drum 10 is higher than the speed of the recording medium, and the individual printing elements 30 of the matrix rows are controlled correspondingly, in such a way that the ink 13 is transferred exactly in position onto the recording medium 14. As in the preceding exemplary embodiments, the printing elements 30 are connected to an activation unit 40 via column lines 42. According to FIG. 12, a layer 47 containing the heating elements 31 and the column lines 42 is applied on the carrier 23. Above said layer 47 is arranged a layer 48 of oliophobic material which has perforations 49 in each case in the region of the heating elements 31.

Figure 13:
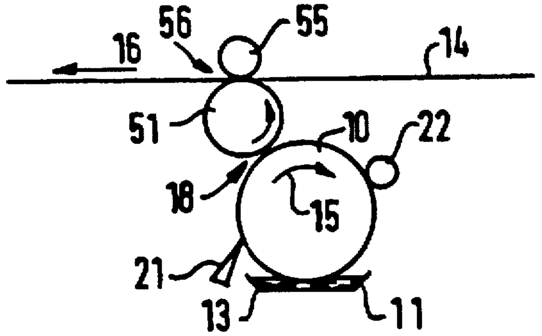
FIG. 13 shows a thermoelectric printing unit having an intermediate carrier between the printing drum and recording medium.

According to FIG. 13, the thermoelectric printing unit according to FIG. 1 is expanded by an intermediate carrier 51. The printing image is transferred onto this intermediate carrier 51 by means of a printing drum 10 designed according to the above description. In this case, the printing drum 10 cooperates with an inking station 11, a stripping batten 21 and a cleaning station 22. The printing image transferred onto the intermediate carrier 51 is transferred onto the recording medium 14 at a transfer printing point 56.

The intermediate carrier 51 is designed as a circular-cylindrical roller with an elastic outer surface. At the transfer printing point 56, the recording medium 14 is transported through between a backing roll 55 and the intermediate carrier roller 51, which roll tangentially on one another. The printing image is transferred onto the recording medium 14 as a result of the direct contact of the intermediate carrier roller 51 with said recording medium 14. The elastic surface of the intermediate carrier roller 51 ensures that a high quality of transfer printing can be achieved even in the case of rough surfaces of the recording medium 14 or in the case of irregular surface shapes of the recording medium, such as in label printing. Furthermore, the use of the intermediate carrier roller 51 provides protection for the printing drum 10 against any soiling which occurs in the immediate vicinity of the printing drum 10 as a result of the transport of the recording medium 14 past the latter. Spatial separation can be achieved by means of particular spatial separation measures (not shown), such as, for example, the installation of the printing drum 10 in a virtually completely closed housing.

Figure 14:
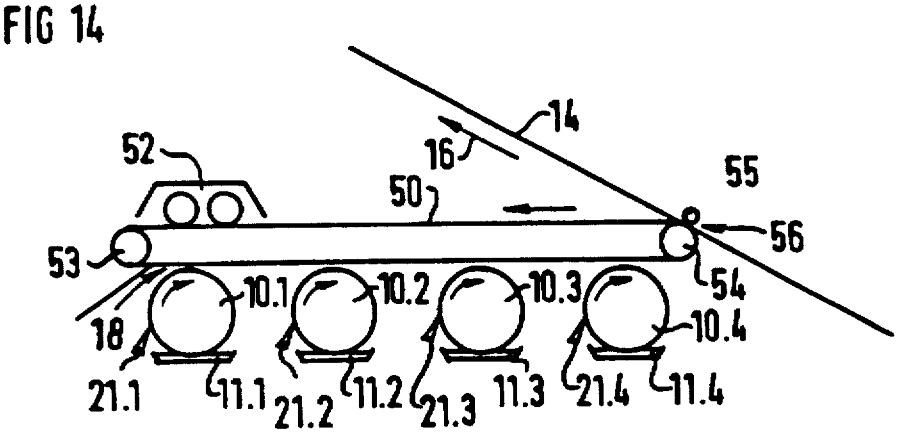
FIG. 14 shows a thermoelectric printing unit having a plurality of printing drums assigned to the intermediate carrier.

A thermoelectric printing unit suitable for multicolor printing is illustrated in FIG. 14. An intermediate carrier 50 transports a multicolored printing image applied to the intermediate carrier 50 to a transfer printing point 56, where, according to FIG. 13, the printing image can be transferred onto the recording medium 14 as a result of the cooperation of the intermediate carrier 50 and of a backing roll 55. The intermediate carrier 50 is designed as an intermediate carrier band which is transported between two deflecting rollers 53, 54. Four transfer printing rollers 10.1, 10.2, 10.3, 10.4 are arranged along the intermediate carrier band 50. Ink 13 is transferred onto the intermediate carrier 50 by means of these transfer printing rollers 10. Each transfer printing roller 10 is assigned an inking station 11.1, 11.2, 11.3, 11.4. Each inking station 11 is filled with ink 13 of a different color. By means of a stripping batten 21.1, 21.2, 21.3, 21.4 in each case, this ink is stripped from the surface of the printing drum 10. The transfer printing operation between the printing drums 10 and the intermediate carrier 50 is controlled in such a way that a complete colored printing image is present on the intermediate carrier 50 and is transported by the latter to the transfer printing point 56, where it is transferred onto the recording medium 14. Ink residues remaining on the intermediate carrier 50 after transfer printing onto the recording medium 14 are removed by a cleaning station 52 which is arranged in front of the first printing drum 10.1. Since transfer printing on the individual printing drums 10 takes place contactlessly relative to the intermediate carrier band 50, there is no risk of any color entrainment. Synchronization of the drives of the printing drums 10 is possible without difficulty by known mechanical or electronic means.

The invention is not limited to the particular details of the apparatus depicted and other modifications and applications are contemplated. Certain other changes may be made in the above described apparatus without departing from the trus spirit and scope of the invention herein involved. It is intended, therefore, that the subject matter in the above depiction shall be interpreted as illustrative and not in a limiting sense.

What is claimed is:

1. A thermoelectric printing unit for transferring ink onto a recording medium, comprising:

a printing drum;

at least two matrix rows of printing elements which are arranged on the printing drum and which are each formed as a depression in a surface of the printing drum, a selectively activatable heating device being provided in the depression;

an inking station arranged on a circumference of the printing drum, said inking station transferring ink from the surface of the printing drum into the printing elements; and a transfer printing point, at which the heating elements are activatable according to printing information, as a result of which ink is transferred out of corresponding printing elements and onto the recording medium.

2. The thermoelectric printing unit as claimed in claim 1, wherein said inking station has a distributor roller having a surface that rolls tangentially on the surface of the printing drum, and a trough which extends along the distributor roller, which is filled with ink and into which the distributor roller partially dips.

3. The thermoelectric printing unit as claimed in claim 2, wherein the printing unit further comprises a stripping batten which follows a rolling region of the surface in the direction of movement of the printing drum and which extends along the surface of the printing drum and strips excess ink from the surface.

4. The thermoelectric printing unit as claimed in claim 1, wherein the printing unit. further comprises a cleaning station which is arranged on the circumference of the printing drum and which is moveable for contacting the surface of the printing drum.

5. The thermoelectric printing unit as claimed in claim 1, wherein the outer surface of the printing drum has a hydrophobic and/or oliophobic protective layer.

6. The thermoelectric printing unit as claimed in claim 1, wherein the printing unit has an arrangement of the printing elements as an endless matrix, said arrangement corresponding to a resolution of a printing image.

7. The thermoelectric printing unit as claimed in claim 1, wherein the printing unit has an arrangement of at least two matrix rows which extend axially on the printing drum and wherein the printing unit has heating elements which are alternately activatable and which are associated with the matrix rows.

8. The thermoelectric printing unit as claimed in claim 7, wherein the directly adjacent printing elements are arranged offset along a respective matrix row of the at least two matrix rows on both sides of a bisecting line.

9. The thermoelectric printing unit as claimed in claim 1, wherein the printing unit has matrix rows extending diagonally between end faces of the printing drum.

10. The thermoelectric printing unit as claimed in claim 1, wherein the recording medium is an intermediate carrier and rolls on a printing material in a region of a backing device, as a result of which a printing image is transferred onto the printing material.

11. The thermoelectric printing unit as claimed in claim 10, wherein a plurality of printing drums are assigned to the intermediate carrier.

12. The thermoelectric printing unit as claimed in claim 1, wherein the printing unit has an activation unit for selectively activatable heating devices, which activation unit is coupled to the printing drum.

* * * * *